United States Patent

[11] 3,602,610

| [72] | Inventor | Carl Bloom<br>Springfield, Mass. |
|---|---|---|
| [21] | Appl. No. | 12,813 |
| [22] | Filed | Feb. 19, 1970 |
| [45] | Patented | Aug. 31, 1971 |
| [73] | Assignee | Worthington Compressor and Engine<br>International Division of Worthington<br>Corp.<br>Holyoke, Mass. |

[54] CONTROL SYSTEM FOR ROTARY COMPRESSORS
21 Claims, 4 Drawing Figs.

[52] U.S. Cl. ................................................. 417/12,
417/282, 417/295
[51] Int. Cl. ....................................................... F04b 21/02
[50] Field of Search........................................... 417/12, 14,
26, 28, 295, 282

[56] References Cited
UNITED STATES PATENTS

| 2,589,006 | 3/1952 | Yerger .......................... | 417/12 |
|---|---|---|---|
| 3,122,349 | 2/1964 | Kaminky ........................ | 417/28 |
| 3,168,236 | 2/1965 | Lamberton et al. ........... | 417/295 |

*Primary Examiner*—Carlton R. Croyle
*Assistant Examiner*—Richard J. Sher
*Attorney*—Fishman and Van Kirk

ABSTRACT: A Control system for a motor-driven, rotary air compressor which includes a suction control throttling valve at the compressor inlet. The control system automatically shuts down the driving motor whenever the compressor operates near its unloaded condition for an extended period of time. The control system also restarts the driving motor upon a subsequent demand for compressed air.

INVENTOR.
CARL BLOOM
BY Fishman and Van Kirk

ATTORNEYS

CONTROL SYSTEM FOR ROTARY COMPRESSORS

BACKGROUND OF THE INVENTION

1. Field of the Invention

This invention relates to the field of rotary compressors of the vane or screw type which incorporate control systems for starting and stopping the compressor and its driving motor as a function of the load demand on the compressor.

2. Description of the Prior Art

Modulating controls in compressor inlets regulate the suction pressures at the compressor inlet ports. The modulating control generally employs an inlet valve which can be adjustably positioned between an opened and closed position to restrict the quantity of incoming gas flow to the compressor inlet ports. The modulating valve is frequently a pressure operated valve and the control pressure is derived by sensing the supply pressure at the compressor output. The supply pressure is transmitted to a control pressure regulator and the pressure perturbations above a preadjusted regulating pressure are transmitted by the regulator as pressure signals to a diaphragm or piston which actuates the modulating valve.

Modulation of the suction pressure at the compressor inlet ports by means of the supply pressure offers compression with minimal variation of discharge pressure, allows constant operation at the lowest possible supply pressure setting, and requires minimum air storage volume. Compressor systems which do not have modulating control operate between fixed cut-in and cutout pressures with a relatively large air receiver, and require higher cutout pressures to maintain the same reserve potential as a comparable compressor with modulating control.

A further efficiency in compressor operation can be realized if the driving motor for the compressor is slowed down such as shown in U.S. Pat. No. 3,059,832 or completely shut down when the load demand on the compressor is very small or zero. The desirability of this feature is equally as valid for compressors which have modulated control or on-off operation at fixed cut-in and cutout pressures.

Detecting the zero or small load condition with the on-off control systems is a relatively simple matter. With modulated control systems the problems are more acute due to the difficulty of sensing exactly when the small load condition exists. It is not feasible to detect the mechanical position of the conventional modulating valve nor the magnitude of the control pressure operating that valve since it is difficult to differentiate between the fully unloaded condition and partial loads of up to approximately 15 percent of fully loaded condition. The reliability of the position and pressure parameters is usually inadequate to command a shutting off of the motor driving the compressor at a desired minimum air demand.

SUMMARY OF THE INVENTION

This invention relates to a control system for a rotary compressor with a modulating suction control valve.

To accurately detect the zero or small load condition, a calibrated suction control bypass is incorporated in the suction inlet to leak a small quantity of inlet gas around the closed suction throttling valve at the small load condition. This leakage flow passes through the compressor and eventually to the receiver which stores the compressed gas. The bypass flow is calibrated to permit the receiver or supply pressor to build up at a very slow rate above the normal no-load supply pressure which is supposed to close the throttling valve. If the compressor is actually at or near the no-load condition which permits shutdown, the supply pressure will build up to an amount which is incrementally greater than the no-load pressure. This incremental pressure difference can be readily detected to distinctly manifest the zero or small load condition. If the no-load condition is not present within a small tolerance less than the leakage flow, the incrementally greater pressure will never be reached.

Once the incremental pressure increase has been detected a bleed valve in a discharge portion of the system is opened to bleed down oil tanks and demister tanks. At the same time a check valve between the bleed valve and the compressor receiver prevents the accumulated compressed gas in the receiver from being lost through the bleed valve. Once the tanks have bled down to a minimal pressure, the motor driving the compressor can be shut off.

In one embodiment of my invention, the shutoff signal for the motor is derived from a pressure switch which senses the bleddown pressure in the discharge manifold. In another embodiment of my invention the detection of the incremental pressure increase in the supply receiver trips a timer which subsequently signals the driving motor to shut off at the end of a time period sufficient to bleed down the discharge portion of the system.

The pressure switch which detects the incremental increase in the supply pressure conduit can be located at several positions. The pressure switch can be connected directly to the supply conduit and be adjusted to actuate at a pressure incrementally higher than the desired supply line pressure which closes the suction control valve. Alternately, the pressure switch can be sensitive to the pressure which operates the valve itself. A control pressure conduit connected from the supply pressure conduit to the control valve includes a pressure regulator. The pressure regulator opens gradually as the critical supply pressure at the no-load condition is reached and transmits regulated pressure to the control valve to cause the control valve to gradually close and drop the suction pressure and the quantity of airflow passing through the valve. This regulated pressure which operates the suction control valve is also a suitable pressure for triggering the automatic shut down of the compressor motor. Because of the greater pressure variation of the regulated pressure at the critical supply conduit pressure, a more sensitive automatic shutdown signal can be derived.

An orifice bleed line is connected to the conduit which transmits regulated air pressure to the control section of the suction control valve. The pressure in the control section varies as the pressure regulator feeds more or less air through the fixed bleed orifice. This bleed line and the suction control bypass line may include solenoid valves to close off the suction chamber leading to the compressor inlet port when the compressor is being shut down.

DESCRIPTION OF THE PREFERRED EMBODIMENTS

Figure 1:
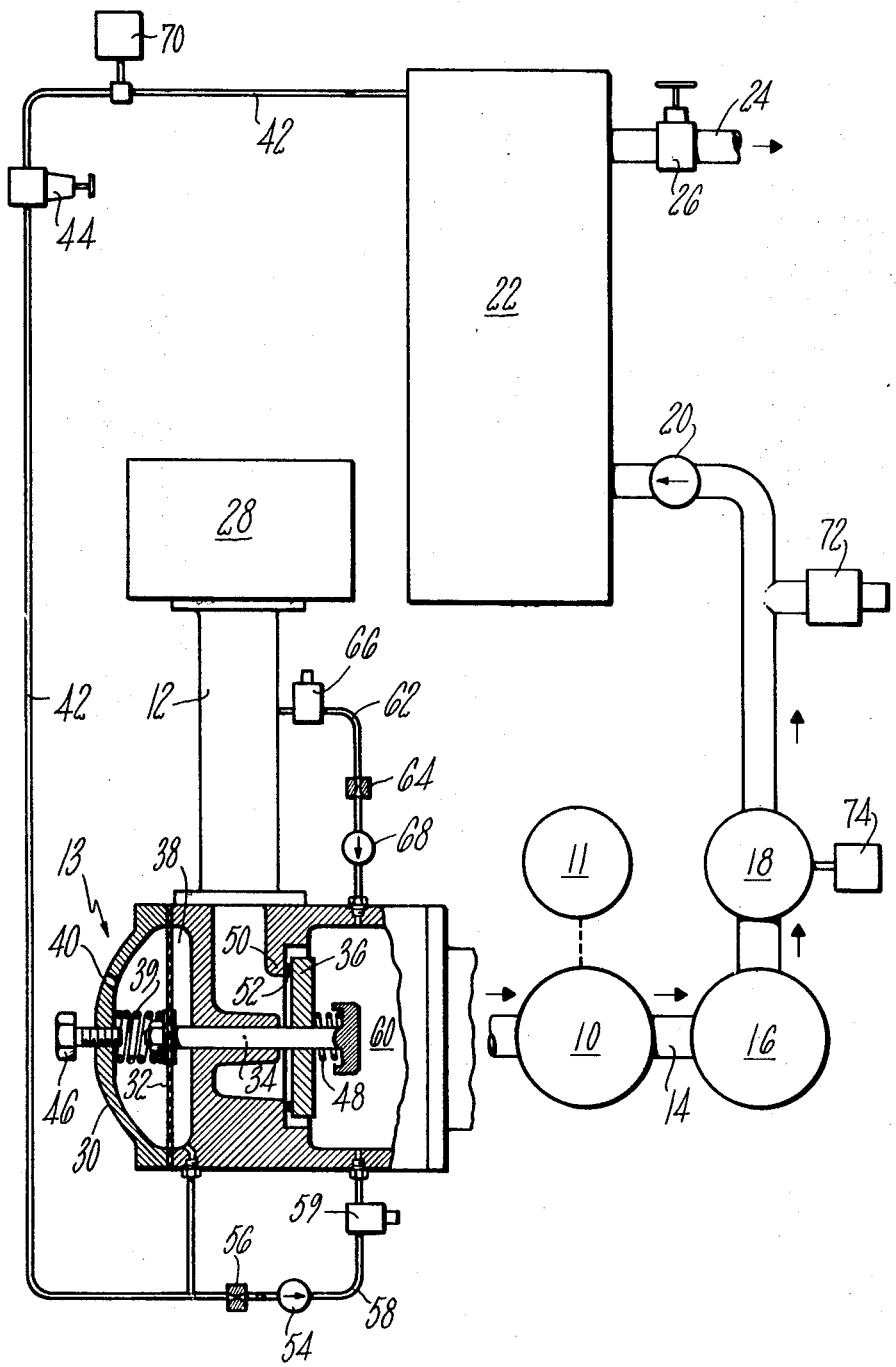
FIG. 1 is a schematic diagram of one embodiment of my new and improved compressor control system employing the suction control bypass line.

Reference to FIG. 1 shows the principle components of my automatic compressor shutdown system in schematic form. The flow of air for compressor 10 driven by electrical motor 11 is ingested by a filtered inlet 12 and passes through a suction throttling control valve, generally designated 13, to the inlet ports of compressor 10. After the air has been compressed it flows through a discharge manifold 14, an oil tank 16, a demister tank 18 and a check valve 20 which leads into a receiver 22. The compressed air is stored in receiver 22 until a load demand is imposed at the supply conduit 24. The demand may come from any type of pneumatic device such as a rock drill or air hammer. A discharge valve 26 can be closed when the pneumatic device is disconnected from the supply conduit 24.

The upper end of inlet 12 includes an inlet filter 28 which cleans the air ingested from the ambient atmosphere. After leaving the filter 28 the air passes through a straight section of the inlet 12 into the suction control valve 13. The valve 13 consists basically of a housing 30, a resilient diaphragm 32, a spring biased valve stem 34 operated by the diaphragm and valve plate 36 slidably mounted on and in close fitting contact with the valve stem 34. The housing includes a pressure control chamber 38 on one side of the diaphragm 32 which operates against the force generated by spring 39. The opposite side of the diaphragm is exposed to atmosphere through a vent port 40.

A control pressure line 42 connects from the receiver 22 through a pressure regulator 44 to the control pressure chamber 38 on the one side of diaphragm 32. As the pressure in the receiver builds up to a preselected supply pressure, the regulator 44 transmits a portion of this pressure through line 42 to diaphragm 32 and causes the diaphragm together with the valve stem 34 to displace toward an adjustable set screw 46 against the force of spring 39. The displacement of valve stem 34 urges valve plate 36 against the valve seat 50 formed in the housing 30. A rubber seal ring 52 bonded to the valve plate 36 may be employed to insure good sealing characteristics between the plate 36 and the valve seat 50. Either the close fit between stem 34 and plate 36 or an O-ring between stem 34 and plate 36 provides sealing around the stem 34. The slidable valve plate 36 serves the function of a check valve. Normally spring 48 is compressed by airflow pushing plate 36 away from seat 50. In the event that the compressor 10 stops while the control valve 13 is open, spring 48 quickly closes plate 36 and thereby prevents large quantities of oil laden air from backflowing through the compressor 10 from discharge manifold 14. The checking function of plate 36 prevents backwashing of filter 28 and expulsion of oil laden air from the filter inlets.

The level of the pressure perturbations derived from supply conduit 24 which operate diaphragm 32 and cause the valve plate 36 to close against seat 50 can be adjusted by means of the regulator 44. The control pressure perturbations from the regulator 44 therefore control the position of suction valve 13 as a function of the supply pressure or demand load on the compressor 10 since the pressure in conduit 24 is directly related to the demand load at steady-state conditions. The regulator 44 does not transmit pressure perturbations until the supply pressure in conduit 24 reaches pressure levels above the setting of regulator 44. The perturbations downstream of regulator 44 are larger than those in supply conduit 24 near the no-load condition due to the design of the control valve and orifice 56.

If the supply pressure near the no-load condition drops as the load demand increases, the control pressure in chamber 38 will drop as air is bled through check valve 54, orifice 56, bleed line 58 and solenoid valve 59 into the suction chamber 60 which leads to the inlet ports of compressor 10. The bleeding of chamber 38 permits the diaphragm 32 and valve stem 34 to displace toward the suction chamber 60. The pressure differential across the valve plate 36 forces the plate 36 to displace with the valve stem 34 and thereby admits a metered flow of air from inlet 12 to the suction chamber 60 and the compressor 10. This closed loop modulation of the air flowing through inlet 12 to suction chamber 60 and compressor 10 matches the inlet airflow with the demand at supply conduit 24.

Needless wear of the compressor and needless energy consumption can be eliminated by shutting down the compressor drive motor 11 during extended unloaded or small load conditions. With rotary vane compressors such as shown it is difficult to distinguish between different load conditions below 15 percent of the full load condition. The difficulty is traceable to the fact that the displacement of conventional suction control valves is not accurate enough to determine the exact load condition at small loads with good reliability. Similarly, the pressure signal operating the valve is likewise not a good indicator of the unloaded condition since it may vary over a range of approximately 8 p.s.i. at the no-load condition for a single compressor depending upon variables of operation. Use of either the position of a conventional valve or the control pressure, without more, to detect the no-load condition would result in premature shutdown or sustained operation when shutdown is appropriate.

In order to overcome the difficulty of accurately detecting the small load conditions, my new and novel control system includes a suction control bypass which leaks a small flow of air past the closed valve plate 36 at the unloaded condition. The bypass can take several forms.

In FIG. 1 the bypass is provided by a bypass line 62 which contains a calibrated orifice plate 64. The line 62 extends from a section of the inlet 12 which contains unmodulated, ambient air immediately after it passes through filter 28 to the suction chamber 60 downstream of the valve plate 36. When a solenoid valve 66 is open and compressor 10 has developed a low pressure in suction chamber 60, a small leakage flow of inlet air will pass around the control valve 13 and into compressor 10. If there is no demand or an extremely small demand for compressed air at supply conduit 24, the pressure in the conduit 24 will have actuated valve plate 36 to the closed position. At this point the leakage flow through bypass line 62 will cause the pressure in receiver 22 and the supply conduit 24 to rise at a small rate established by the calibrated orifice 64. The orifice 64 will be selected to increase the supply pressure by an incremental amount above the standard supply pressure over a brief period of time sufficiently long to verify that the no-load condition exists. For example, the orifice 64 may be selected to increase the supply pressure by 5 p.s.i. above the normally unloaded supply pressure of 115 p.s.i.g. over a period of 5 minutes.

The bypassing of this leakage flow around the closed control valve 13 now permits the pressure in the supply conduit 24 to be a reliable indicator of the zero or small load condition. If the flow of air leaving the supply conduit 24 is less than that leakage flow bypassing control valve 13 the pressure in supply conduit 24 will increase during the small load condition to a valve which can be readily distinguished from the pressure that is supposed to close valve 13. In addition, the time factor associated with the sampling of the supply pressure during the small load condition prevents a premature shutdown of the compressor when there are short, intermittent demands for the high pressure air. Once the supply pressure has reached the value incrementally above the normal unloaded pressure, the unloaded condition can be readily detected by a pressure switch 70 located in the pressure control line 42. The pressure switch 70 opens and signals the initiation of the compressor shutdown sequence.

When pressure switch 70 opens, a solenoid operated bleed valve 72 in the discharge manifold 14 is opened by switch 70 to discharge high pressure air from manifold 14, oil tank 16 and demister tank 18 upstream of check valve 20. At the same time, pressure switch 70 closes solenoid valve 66 in the suction bypass line 62 and solenoid valve 59 in bleed line 58. The closing of valve 66 prevents any further leakage of inlet air into the suction chamber 60 and compressor 10. The closing of solenoid valve 50 prevents the dumping of high-pressure gas from the receiver 22 through control line 42 and bleed line 58 into suction chamber 60. The compressor 10 continues to run as the discharge manifold and tanks 16 and 18 bleed through valve 72. The check valve 20 prevents air stored in receiver 22 from being lost through the bleed valve 72. When the pressure in discharge manifold 14, oil tank 16 and demister tank 18 has been bled down to a pressure close to zero, for example 5 p.s.i.g., pressure switch 74 opens and shuts off motor 11.

Figure 2:
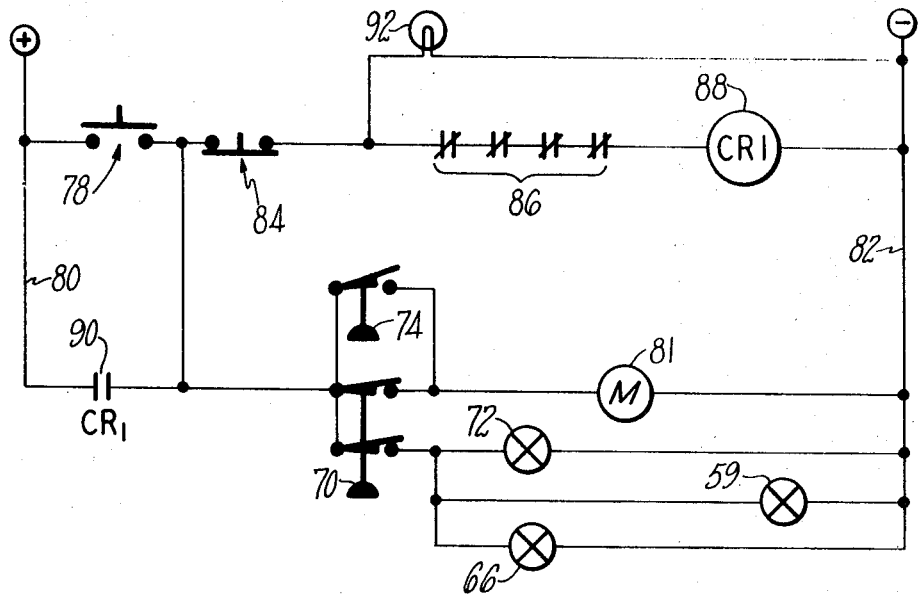
FIG. 2 is an electrical diagram of the control circuitry interconnecting the components of my compressor control system shown in FIG. 1.

A starting and automatic shutdown sequence according to the above will be more fully understood by reference to the electrical control circuitry shown in FIG. 2. The compressor motor starter 81 is actuated by momentarily closing start switch 78 which draws power from the power buses 80 and 82. The motor starter 81 is a conventional component which, when actuated, energizes the compressor driving motor 11 and maintains the energization until deactuated. The momentary application of power through normally closed stop switch 84 and interlocking safety switches 86 to holding relay 88 will close normally open contacts 90 and apply power continuously to the relay 88 and the motor starter 81 by means of closed pressure switch 70. At the same time, the power light 92 goes on. Any time that either the manual stop switch 84 or any one of the safety switches 86 is opened, power to the relay 88 and consequently to the motor starter 81 is cut off.

The application of electrical power to motor starter 81 through switch 70 also closes solenoid valve 72 and opens solenoid valves 59 and 66 which are connected with pressure switch 70.

When the compressor reaches the unloaded condition and has developed a corresponding supply pressure in the receiver 22, for example, 115 p.s.i.g., suction throttling valve 13 will be closed; however, leakage of inlet air through bypass line 62 will continue to increase the pressure in receiver 22 until it reaches an incrementally higher pressure, for example 120 p.s.i.g., providing there is no-load demand at conduit 24. At 120 p.s.i.g. pressure switch 70 opens and removes power from solenoid valves 70, 59 and 66. Solenoid valve 72 opens to bleed the discharge manifold 14 and solenoid valves 59 and 66 close to prevent any further compression of air by compressor 10. The motor starter 81 keeps the compressor motor 11 running after pressure switch 70 has opened due to the parallel circuit through closed pressure switch 74 which remains closed whenever pressure in demister tank 18 and the remaining portion of the discharge manifold is above the bleed down pressure, for example, 5 p.s.i.g. When the pressure in demister tank 18 has dropped to the bleed down pressure, pressure switch 74 opens deactuating starter 81 and compressor motor 11 stops.

Once the compressor motor 11 has been shut down, the system will remain tin the static condition until a further demand is imposed on the supply conduit 24. My new and improved control system includes provisions for automatically restarting the compressor motor after the load demand has caused a preselected drop in the receiver 22 or supply conduit 24.

Pressure switch 70 is of the type which possesses a differential characteristic. Such a pressure switch opens at one pressure such as 120 p.s.i.g., and closes at a slightly different pressure, such as 110 p.s.i.g. The 10 p.s.i. differential band is selected to bracket the normally unloaded supply pressure of 115 p.s.i.g. at which the suction control valve 13 is fully closed. As a consequence, when a further demand is imposed on the supply conduit 24 and the supply pressure in receiver 22 drops by a preselected amount below the normally unloaded supply pressure, pressure switch 70 closes and again completes the electrical circuit between the holding contacts 90 and motor starter 81. At the same time, the solenoid valve 72 which was open to bleed the discharge manifold 14 is closed and solenoid valve 59 in bleed line 58 and solenoid valve 66 in bypass line 62 are opened.

At this point compressor 10 will begin drawing air through the suction control valve 13 which has opened slightly as a result of the reduced supply pressure in receiver 22. The compressor 10 will develop high-pressure air in discharge manifold 14 and eventually open check valve 20 to reestablish the appropriate supply pressure in receiver 22. When another no-load condition recurs, the automatic shutdown and startup sequence will be repeated.

Figure 4:
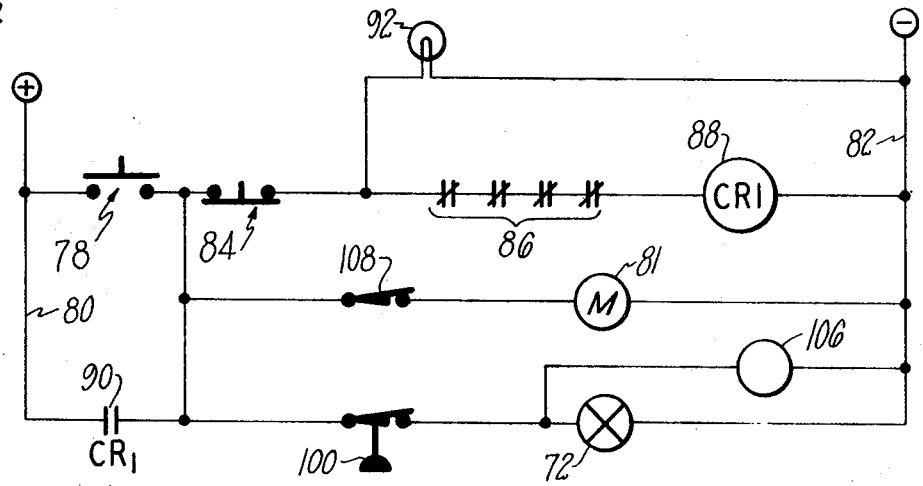
FIG. 4 is an electrical diagram of the control circuitry which interconnects the components of my alternate control system shown in FIG. 3.
Figure 3:
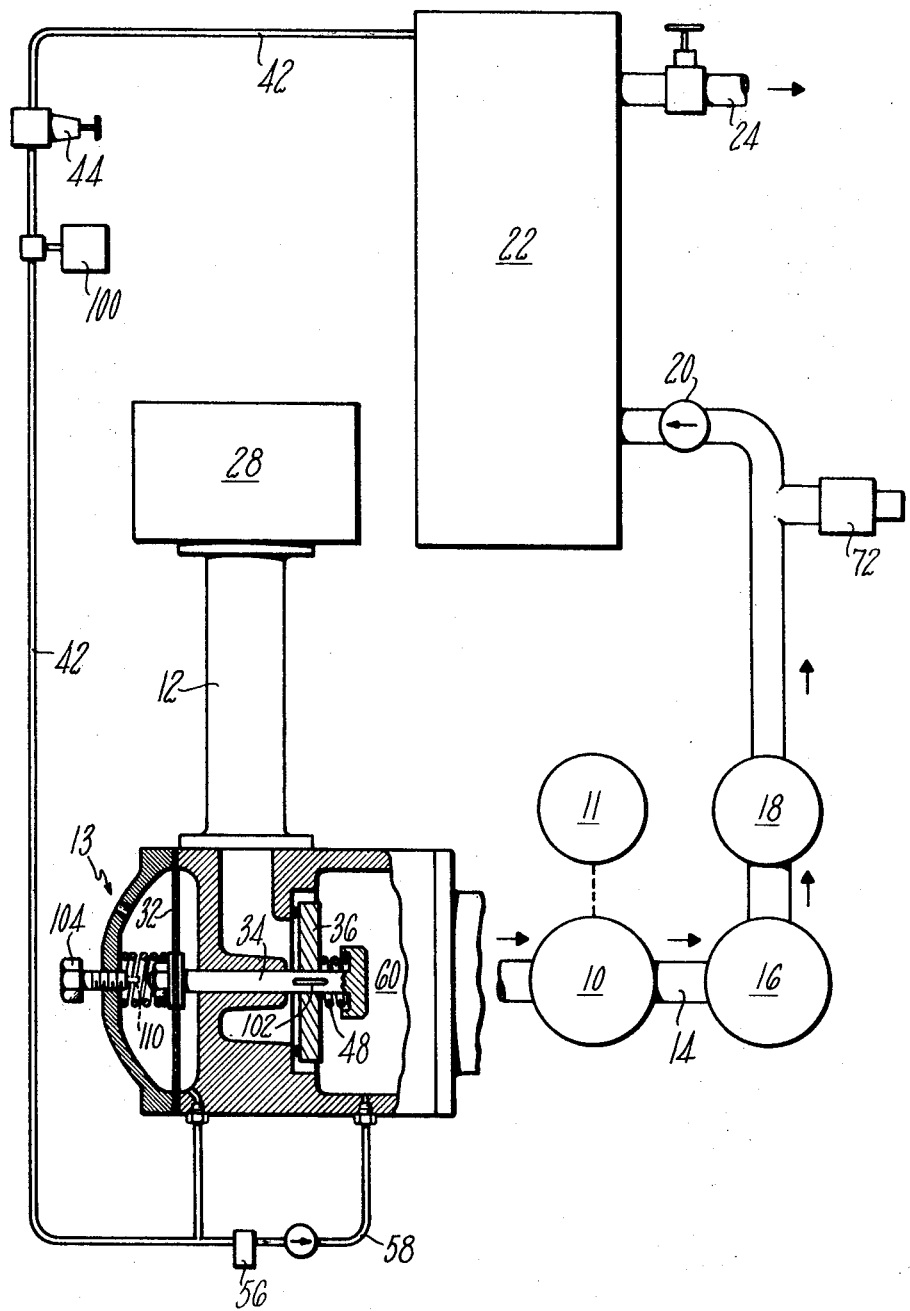
FIG. 3 is a schematic diagram of an alternate embodiment of my compressor control system employing the suction control bypass line.

Another embodiment of my novel control system is shown in FIGS. 3 and 4. Components which are identical with those i5 FIGS. 1 and 2 bear the same numerals. Several structural distinctions may be noted.

The pressure switch which detects the supply pressure in receiver 22 is pressure switch 100 located in the pressure transmitting conduit 42 downstream from the pressure regulator 44. At this position, pressure switch 100 senses the regulated supply pressure which controls the suction control valve 13 rather than the supply pressure directly. The regulated pressure will tend to follow fluctuations of the supply pressure at its upper ranges. The advantage of locating pressure switch 100 downstream of regulator 44 is that the control pressure perturbations are larger in the vicinity of the unloaded condition than are the supply pressure perturbations, as mentioned above. The greater perturbations of the control pressure provide greater sensitivity to the unloaded condition.

The suction control valve 13 includes an internal bypass and consequently the bypass line 62 of FIG. 1 has been omitted. The internal bypass is formed by means of a slot 102 cut in the valve stem 34. The slot 102 extends diametrically through the stem and has a length along the stem axis greater than the thickness of valve plate 36. In addition, the slot 102 is positioned axially in the stem 34 so that the slot is exposed on opposite sides of the valve plate 36 at the regulated pressure in line 42 which closed valve plate 36 at the supply pressure corresponding to the unloaded load condition. The spring 48 is stronger in this embodiment than that used in FIG. 1 to assure valve closing while a small amount of stem displacement remains.

It will be readily apparent that inlet airflow will continue to bypass the closed valve plate 36 at the unloaded condition by means of slot 102 and consequently the supply pressure will continue to build up at a rate determined by the amount of slot 102 which is exposed in the suction chamber 60. As the supply pressure continues to climb, the valve stem 34 is urged further toward the set screw 104 and the flow of leakage air passing through slot 102 is gradually reduced. Before the slot 102 is completely submerged in the close-fitting valve plate 36, the supply pressure is incrementally increased and pressure switch 100 opens to initiate the compressor shutdown sequence.

As seen more clearly in both FIGS. 3 and 4, when pressure switch 100 is opened by the incrementally higher supply pressure, solenoid valve 72 opens to bleed down the discharge manifold 14 and tanks 16 and 18. Check valve 20 prevents the loss of high-pressure air from receiver 22. In addition, pressure switch 100 trips a timer 106 which begins a countdown for a bleed period such as 5 minutes. During this countdown period the compressor 10 continues to be driven by motor starter 81 and the bleeding process substantially exhausts all the compressed air upstream of check valve 20. At the end of the countdown period, timer 106 opens timer switch 108 and shuts down the compressor through motor starter 81.

During the shutdown period a small quantity of compressed air will continually bleed through line 42 and orificed line 58 into suction chamber 60 and out through the slot 102 or the compressor 10, discharge manifold 14 and valve 72. This small quantity of leakage through line 58 will maintain the regulated pressure operating valve 13 at a value commensurate with the supply pressure in receiver 22. Relief of the regulated pressure in the event that the supply pressure in receiver 22 drops a preselected amount below the normal no-load supply pressure permits the pressure switch 100 to reestablish power to motor starter 81. Again, pressure switch 100 would have differential characteristics similar to those of pressure switch 70 of FIG. 1. For example if the supply pressure at the unloaded condition was 115 p.s.i.g. and is permitted by the inlet bypass to rise to 117 p.s.i.g., pressure switch 100 could be caused to open at a regulated pressure of 45 p.s.i.g. If a subsequent demand causes the supply pressure to drop below 115 p.s.i.g. by a preselected amount, the pressure switch 100 with differential characteristics similar to pressure switch 70 in FIG. 1 closes at a reduced regulated pressure, for example, 35 p.s.i.g. The closing of switch 100 closes solenoid valve 72 and resets timer 106. Resetting the timer will close switch 108 and reestablish power to the motor starter 81. The shutdown and startup sequence repeats as often as necessary until the stop switch 84 is opened and the relay 88 deenergizes the entire control system.

It will be noted that the use of pressure switch 100 in combination with the timer 106 in the embodiment of FIGS. 3 and 4 functions as a means for delaying the compressor shutdown while the discharge manifold 14 is being bled. The same delaying function was performed by the pressure switch 70, bleed valve 72 and pressure switch 74 found in the embodiment of FIGS. 1 and 2. The delay in actually shutting off the compressor motor 11 permits the oil tank 16 and demister tank 18 to lose high pressure slowly and thereby prevents foaming of the oil in the tanks. Additionally, the running compressor 10 prevents the backflow of high pressure air through the compressor into the inlet system. The undesirable backflow of compressed air through the compressor can flood the inlet and compressor with large quantities of oil. For these reasons the motor 11 driving the compressor 10 is not shut down until the tanks 16 and 18 have bled off substantially all of the high-pressure air.

The slot 102 in the suction control valve stem 34 makes possible another embodiment of my novel compressor control system. As mentioned above, the position of the conventional suction modulating valves cannot be used to detect the unloaded condition of the compressor system because it is difficult to differentiate between the unloaded condition and small load conditions. With the inlet bypass incorporated in the valve stem 34 by means of slot 102, the relationship between the valve stem position and small load demands, or airflows, is greatly amplified without distortion. It is far easier to determine the load condition at small loads by detecting the position of the valve stem 34 than would otherwise be possible with a conventional modulating valve such as shown in FIG. 1. As a consequence, a microswitch 110 having differential characteristics similar to pressure switch 100 could be mounted within setscrew 104 to detect the position of valve stem 34 at the position corresponding to a supply pressure in receiver 22 which exceeds the normal supply pressure by an incremental amount. The microswitch 110 may be substituted as the functional equivalent of the pressure switch 100 in the electrical schematic of FIG. 4 to accomplish the shutdown and startup operations.

It will be understood that modifications other than those discussed above can be made to my compressor control system without departing from the spirit and scope of the invention. For example, the bypass line 62 shown in FIG. 1 need not be connected directly to the inlet 12 downstream of filter 28 but instead, may have a separate filter and ingest the ambient air directly. The use of timer 106 to provide the delayed compressor shutdown signal or use of the pressure switch 74 to provide the delayed shutdown signal is not peculiar to any of the embodiments disclosed. Either component operates satisfactorily in the various embodiments. While the leakage flow by the suction control valve 13 at the small load condition is a principal feature of my compressor control system, it will be readily understood that the leakage flow can be provided by either the separate bypass line 62 or the slot 102 integrally formed in valve stem 34 without affecting the operation of the various embodiments. The automatic shutdown and startup system disclosed reduces the required capacity of the receiver, since the receiver is merely a signal device to start and stop the compressor. It is is not necessary to store large quantities of compressed air for heavy demands while the compressor is shutdown. The receiver may often be eliminated when air piping is of sufficient volume to produce smooth operation of the system.

Having thus described my invention, I claim:

1. A control system for a motor driven rotary gas compressor having a modulating suction control valve in the compressor inlet and a discharge manifold connecting with a compressed gas supply conduit comprising:

pressure signaling means operatively connected with the supply conduit for providing an excess supply pressure signal and a load demand pressure signal;

controlled bypass means operatively connected with the pressure signaling means and connected to the compressor inlet in parallel with the modulating suction control valve for controllably bypassing inlet gas around the control valve in response to the excess supply and demand pressure signals;

check valve means interposed between the supply conduit and the discharge manifold to prevent reverse flow into the discharge manifold;

controllable bleed valve means operatively connected to the discharge manifold and responsive to the pressure signals from the pressure signaling means for controlled bleeding of the discharge manifold;

delay means operatively associated with the pressure signaling means for providing a delayed motor cutoff signal in response to the excess supply pressure signal.

2. The control system of claim 1 wherein:

the delay means includes the controllable bleed valve means responsive to the pressure signaling means and a pressure switch in the discharge manifold and actuated at a bleed down pressure.

3. The control system of claim 1 wherein:

the delay means includes a timer triggered by the pressure signaling means.

4. The control system of claim 1 wherein:

the controlled bypass means includes a solenoid valve having an open position permitting gas flow through the bypass means and a closed position preventing gas flow through the bypass means, the open position being commanded by the demand pressure signal and the closed position being commanded by the excess supply pressure signal.

5. The control system of claim 4 wherein:

the bypass means includes a calibrated orifice plate interposed in the bypass means for passing a preselected gas flow through the solenoid valve in the open position.

6. The control system of claim 1 for a rotary compressor having a pressure-operated, modulating suction control valve wherein:

a pressure transmitting conduit is connected between the supply conduit and the pressure-operated, modulating valve for operating the valve in response to the pressure variations in the supply conduit; and a suction control pressure regulator is interposed in the pressure transmitting conduit to regulate the pressure operating the modulating valve in response to the variations of the pressure in the supply conduit.

7. The unloading system of claim 6 wherein:

the pressure signaling means operatively connected with the supply conduit is a pressure switch connected to the pressure transmitting conduit between the pressure regulator and the modulating valve.

8. A load condition detecting mechanism for a rotary vane air compressor having a suction modulating valve in the compressor inlet and a compressed air supply conduit connected with the compressor discharge comprising:

suction control means sensitive to the compressed air supply pressure in the supply conduit and connected to the suction modulating valve for closing the valve at a given supply pressure in the supply conduit and thereby reducing the compressor output at a preselected load condition;

inlet bypassing means defining a passageway communicating at one end with ambient, unmodulated air and at the other end with a first inlet portion which transmits modulated air from the valve to the compressor for leaking an incremental inlet airflow by the modulating valve at the preselected load condition; and pressure detecting means operatively associated with the compressed air supply conduit and having a pressure signaling level adjusted for signaling a supply conduit pressure an incremental amount greater than the given supply pressure at the preselected load condition.

9. The load condition detecting mechanism of claim 8 wherein:
the passageway defined in the inlet bypassing means communicates at the one end with a second inlet portion upstream in the direction of inlet airflow through the suction modulating valve.

10. The load condition detecting mechanism of claim 8 wherein:
the inlet bypassing means includes an orifice plate calibrated to provide a predetermined incremental inlet airflow.

11. The load condition detecting mechanism of claim 8 wherein:
the pressure detecting means includes a pressure switch sensitive to the pressure in the compressed air supply conduit.

12. The load condition detecting mechanism of claim 8 having a pressure operated suction modulating valve wherein:
the suction control means includes a pressure regulator having an input connected with the compressed air supply conduit and having a regulated pressure output connected to the modulating valve.

13. The detecting mechanism of claim 12 wherein:
the pressure detecting means is a pressure switch sensitive to the regulated pressure form the output of the suction control pressure regulator.

14. The detecting mechanism of claim 13 wherein:
the pressure operated suction modulating valve includes a pressure actuated valve member connected with a pressure actuating valve chamber, the chamber being connected to the regulator and supplied with the regulated pressure; and
a regulated pressure bleeding line including a bleed orifice is connected to the pressure actuating chamber to bleed the chamber upon a decrease of the supply conduit pressure.

15. The detecting mechanism of claim 12 wherein:
the pressure detecting means is a pressure switch sensitive to the pressure in the supply conduit;
the pressure operated modulating valve includes a pressure chamber connected to the output of the pressure regulator, a valve element, a pressure actuated member exposed within the pressure chamber and connected to the valve element for actuating the valve element and an orificed bleed line connected from the chamber to the inlet portion which transmits modulated air.

16. The mechanism of claim 15 additionally providing compressor shutdown and startup signals wherein:
the pressure switch sensitive to the pressure in the supply conduit has differential characteristics whereby the switch opens at a first pressure level and closes at second pressure level finitely different from the first pressure level, one of the pressure levels being an incremental amount above the given supply pressure for signaling compressor shutdown and the other level being a desired amount below the given supply pressure for signaling compressor startup.

17. The mechanism of claim 16 wherein:
the orificed bleed line and the passageway within inlet bypassing means include signal actuated blocking valves connected to the pressure switch, the valves being actuated by the pressure switch to a closed position at the one level above the given supply pressure to an open position at the other pressure level below the given supply pressure.

18. A method of controlling near the unloaded condition a rotary vane air compressor having a suction throttling valve in the compressor inlet and a supply pressure conduit connected to the discharge manifold of the compressor comprising:
monitoring the pressure in the supply pressure conduit;
correlating the monitored supply pressure with a given supply pressure indicative of the unloaded condition to command a closing of the throttling valve;
bypassing an incremental flow of inlet air by the throttling valve to the compressor to slowly increase the supply pressure to a pressure a preselected amount above the given supply pressure;
correlating the monitored supply pressure with the pressure a preselected amount above the given supply pressure to verify that the load condition is less than the incremental flow bypassing the throttling valve; and
signaling the compressor to shutdown at the supply pressure a preselected amount above the given supply pressure.

19. The method of controlling the rotary vane compressor according to claim 18 including the additional steps of:
correlating the monitored supply pressure after the compressor is shut down with a prescribed pressure below the given supply pressure; and
signaling the compressor to startup at the supply pressure equal to the prescribed pressure.

20. The method of controlling the rotary compressor according to claim 18 wherein the step of signaling includes:
bleeding the discharge manifold of the compressor exclusively of the supply pressure conduit;
correlating the manifold pressure with a bled down pressure; and
triggering a shutdown signal at the manifold pressure corresponding to the bled down pressure.

21. The method of controlling the rotary compressor according to claim 18 wherein the step of signaling includes:
starting a timer having a known countdown period at the supply pressure a preselected amount above the given supply pressure; and
triggering a signal to shutdown the compressor at the end of the timer countdown period.